US007471654B2

(12) United States Patent
Mueckenheim et al.

(10) Patent No.: US 7,471,654 B2
(45) Date of Patent: Dec. 30, 2008

(54) CHANNEL ASSIGNMENT BASED ON SERVICE TYPE AND WIRELESS COMMUNICATION ENVIRONMENT

(75) Inventors: Jens Mueckenheim, Nuremberg (DE); Philip Charles Sapiano, Corsham (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 704 days.

(21) Appl. No.: 11/025,668

(22) Filed: Dec. 29, 2004

(65) Prior Publication Data

US 2006/0142020 A1    Jun. 29, 2006

(51) Int. Cl.
*H04Q 7/00* (2006.01)
(52) U.S. Cl. ........................................ 370/329; 370/341
(58) Field of Classification Search ............. 370/329, 370/341
See application file for complete search history.

(56) References Cited

U.S. PATENT DOCUMENTS

| | | | | |
|---|---|---|---|---|
| 6,631,269 | B1 | 10/2003 | Cave | 455/450 |
| 2005/0009527 | A1* | 1/2005 | Sharma | 455/445 |

FOREIGN PATENT DOCUMENTS

GB    2364206    1/2002

OTHER PUBLICATIONS

"IP Multimedia Services Improvements in the GSM/EDGE Radio Access Network"—by Benoist Sebire, Tommy Bysted and Kent Pedersen. VTC, 2003.

(Continued)

*Primary Examiner*—Duc Nguyen
*Assistant Examiner*—Wayne Cai

(57) ABSTRACT

The present invention provides a method and an apparatus for assigning a channel in response to a request for service for a mobile station in a wireless communication network serving a plurality of regions, such as cells in a digital cellular network. The mobile station may be located in one of the plurality of regions. The method comprises determining a first indication of congestion on a forward access channel and a second indication of congestion on a random access channel and assigning at least one channel of a plurality of channels to the mobile station based on the determined first and second indications of congestion. Based on the first indication of congestion, a first threshold may be adjusted for the forward access channel and a second threshold may be adjusted based on the second indication of congestion on the random access channel. A service type of the request for service and a condition of wireless communication environment may be determined for transmission of data over the wireless communication network and to decide if a specific signaling connection for the mobile station located in one of plurality of regions shall be established in a particular mobile station state including a cell dedicated channel state and a cell forward access channel state based on the service type and the condition of wireless communication environment. In this manner, signaling requests, such as radio resource control signaling requests may be classified into different service types and different radio frequency environment conditions, providing an efficient packet data transmission in a wireless communication system by deciding which state to use under different scenarios. By including a wireless communication environment condition, such as the current radio frequency environment status in a channel assignment decision making, a signaling connection may not experience an inferior quality and may avoid a delay and occurrences of dropped connections.

20 Claims, 7 Drawing Sheets

OTHER PUBLICATIONS

"Next Generation Mobile Communications Systems Are Moving Towards the Transparent Delivery of Services in an Environment of Cooperating Networks. Mobile Communications"—by C. Lerouge. Alcatel Telecommunications Review—3rd Quarter 2001.

"Operation and Maintenance Center for 3G Radio Access Networks"—by D. Rinchet, R. Tingaud. Alcatel Telecommunications Review—3rd Quarter 2001.

"Software Defined Radio"—by D. Rouffet, W. Konig. Alcatel Telecommunications Review—3rd Quarter 2001.

"Wireless LAN Technology and HiperLAN/2"—by L. Brignol, M. Litzenburger. Alcatel Telecommunications Review—3rd Quarter 2001.

"Enabling Technologies for Wireless Ad.Hoc Networking"—V. Kumar, Fr. Carrez, J. Riganati. Alcatel Telecommunications Review—3rd Quarter 2001.

European Search Report for Application No. 05257703.8 dated Apr. 20, 2006.

* cited by examiner

CHANNEL ASSIGNMENT BASED ON SERVICE TYPE AND WIRELESS COMMUNICATION ENVIRONMENT

BACKGROUND OF THE INVENTION

1. Field of the Invention

This invention relates generally to telecommunications, and more particularly, to wireless communications.

2. Description of the Related Art

Mobile communication systems are increasingly being utilized to transfer information, such as data, voice, text or video, among communication devices on a wireless network. In fact, huge demands for a wide range of data services in a mobile environment are imposed and a provision of a high Quality of Service (QoS) similar to that provided by fixed networks is desired. To this end, a number of standards for network technologies and communication protocols have been proposed or suggested, rendering a variety of services to users. For example, a third generation partnership project (3GPP) standardization has introduced an Internet Protocol (IP) Multimedia Subsystem (IMS) to support new services. The IMS provides IP based multimedia services to users through a network based on the Universal Mobile Telecommunications System (UMTS) standard. Moreover, an IMS service plays a role for the QoS in a radio access network, such as a Universal Mobile Telecommunications System Terrestrial Radio Access Network (UTRAN). Radio bearers, i.e., services provided for the transfer of user data between user equipment (UE) and UTRAN are designed in a way that is flexible enough to cope with the introduction of future IMS services such as real time multimedia.

Typically, mobile communication systems include a plurality of cells, each of transmitting signals to and receiving signals from mobile stations within its coverage or service area. For example, a coverage or service area of a wireless communication network, such as a digital cellular network is generally partitioned into connected service domains known as the cells, where cellular phone users can communicate, via radio frequency (RF) links, with a base station serving the cell. The cells may be further partitioned into segments, typically three to a cell. A base station may be assigned a plurality of channels within a frequency spectrum over which it can communicate with a mobile station. A mobile station within range of the base station may communicate with the base station using these channels. In general, the channels used by a base station are separated from one another in some manner so that signals on any channel do not substantially interfere with signals on another channel used by that base station or other adjoining base stations. Therefore, for mobile communication systems in which areas served by a wireless network are divided into cells, a way is desired for dynamically allocating available system channels to wireless devices, such as mobile stations requiring service.

The UMTS standard allows the transmission of data (user or control) in two different states, namely a cell dedicated channel (CELL_DCH) state and a cell forward access channel (CELL_FACH) state. Both states can be characterized by their channel usage and have a specific behavior, which makes them suitable for carrying different types of traffic. In the CELL_DCH state, a dedicated connection exists over a dedicated channel (DCH). Due to the application of a closed loop power control and soft handover (SHO), the required transmission power is minimized. On the other hand, for establishing, reconfiguration and release of a DCH, radio resource control (RRC) procedures are used. These RRC procedures cause overhead and radio network controller (RNC) signaling load, which may become significant, especially for short packet transmissions. Hence, the CELL_DCH state is well suited for the transport of large packets, such as packet downloads or conversational traffic.

In the CELL_FACH state, data is transmitted over a random access channel (RACH) in an uplink and a shared forward access channel (FACH) in a downlink. Due to an open loop power control on the FACH, the transmit power requirement is larger than on the DCH and the reliability at the cell border may be less predicable than on the DCH. In addition, the FACH will have a low data rate, typically of the order of 32 kbps to 64 kbps in order to keep the transmit power and interference to an acceptable level, this means that the channel may become congested when multiple users are accessing it. On the other hand, packet handling is performed in a medium access control (MAC) layer and, hence, no overhead due to dedicated signaling procedures is added. Therefore, the CELL_FACH state is a preferred state to transport short and infrequent data, such as background traffic and signaling.

From the characteristic above it may be concluded that RRC signaling, which is exchanged between a UE and a core network (CN), may be best carried over the CELL_FACH due to its infrequent and short nature. However, because of the lack of the closed loop power control, the CELL_FACH is more vulnerable to channel errors, especially in bad environmental situations, such as near an edge of a cell. This effect causes additional delay of the transmission. Furthermore, because a simple scheduling is used in the CELL_FACH, additional delays may occur. For some services, this delay may be unacceptable even for the RRC signaling.

Moreover, the current UMTS standard defines only the UE states and the procedures necessary to transition between these states. However, no method has been specified to decide which state to use under which scenario. Therefore, it is up to each UTRAN vendor to find a suitable solution for this decisional problem in each implementation of the CELL_FACH state for efficient packet data transmission. There are two scenarios for a decision to move into a different UE state. First, for an already existing packet switched (PS) service, the traffic demand might increase/decrease. In that scenario, if certain thresholds are exceeded or lowered, it is beneficial to switch from the CELL_FACH state to the CELL_DCH state and vice versa. This scenario is covered by the vendor specific algorithms. The second scenario occurs for the establishment of a signaling connection, leading to a question of which UE state is best suited for the signaling connection. In that case, the information of the service is only used to decide if a connection should be established in the CELL_DCH state or in the CELL_FACH state. For example, if it is decided to establish a connection in the CELL_FACH state, in worse environment conditions, such as the cell edge, the connection may experience a bad quality because of the current radio frequency (RF) environment situation. In the extreme case, this may lead to a significant delay and even dropped connections over the FACH, if some timers expire.

The present invention is directed to overcoming, or at least reducing, the effects of, one or more of the problems set forth above.

SUMMARY OF THE INVENTION

In one embodiment of the instant invention, a method is provided for assigning at least one channel of a plurality of channels to a mobile station in response to a request for service in a wireless communication network serving a plurality of regions. The mobile station may be located in one of the plurality of regions. The method comprises determining a first indication of congestion on a forward access channel and a second indication of congestion on a random access channel and assigning at least one channel of a plurality of channels to the mobile station based on the determined first and second indications of congestion.

In another embodiment, a method is provided for assigning channels in a cellular network including at least one mobile station and a core network serving a plurality of cells. The mobile station may be located in one of the plurality of cells. The method comprises classifying a radio resource control signaling service request into a service type and a condition of radio frequency environment, deciding when to send a radio resource control signaling in at least one of a dedicated channel and a forward access channel of the one of the plurality of cells based on the service type and the condition of radio frequency environment, and exchanging the radio resource control signaling between the mobile station and the core network.

In yet another embodiment, a cellular telecommunication system may comprise a base station, a plurality of cells, wherein in at least one of the plurality of cells a mobile station communicating with the base station over a wireless communication network and a controller coupled to the base station. The controller may include a memory storing a decision algorithm to determine a channel assignment between a dedicated channel and a forward access channel of the one of the plurality of cells in response to a radio resource control signaling service request for the mobile station on the wireless communication network based on a service type of the radio resource control signaling service request and a condition of radio frequency environment for transmission of data over the wireless communication network.

In still another embodiment, a wireless communication system may comprise a communication node, a plurality of regions, wherein in at least one of the plurality of regions a mobile station communicating with the communication node over a wireless communication network and a controller coupled to the communication node. The controller may assign a channel in response to a request for service for the mobile station on the wireless communication network based on a service type of the request for service and a condition of wireless communication environment for transmission of data over the wireless communication network.

In another embodiment, a controller may control a wireless communication network serving a plurality of regions, wherein in at least one of the plurality of regions a mobile station communicating with a communication node over the wireless communication network. The controller may comprise a processor and a memory coupled to the processor. The memory may store instructions to assign a channel in response to a request for service for the mobile station on the wireless communication network based on a service type of the request for service and a condition of wireless communication environment for transmission of data over the wireless communication network.

BRIEF DESCRIPTION OF THE DRAWINGS

The invention may be understood by reference to the following description taken in conjunction with the accompanying drawings, in which like reference numerals identify like elements, and in which.

Figure 1:
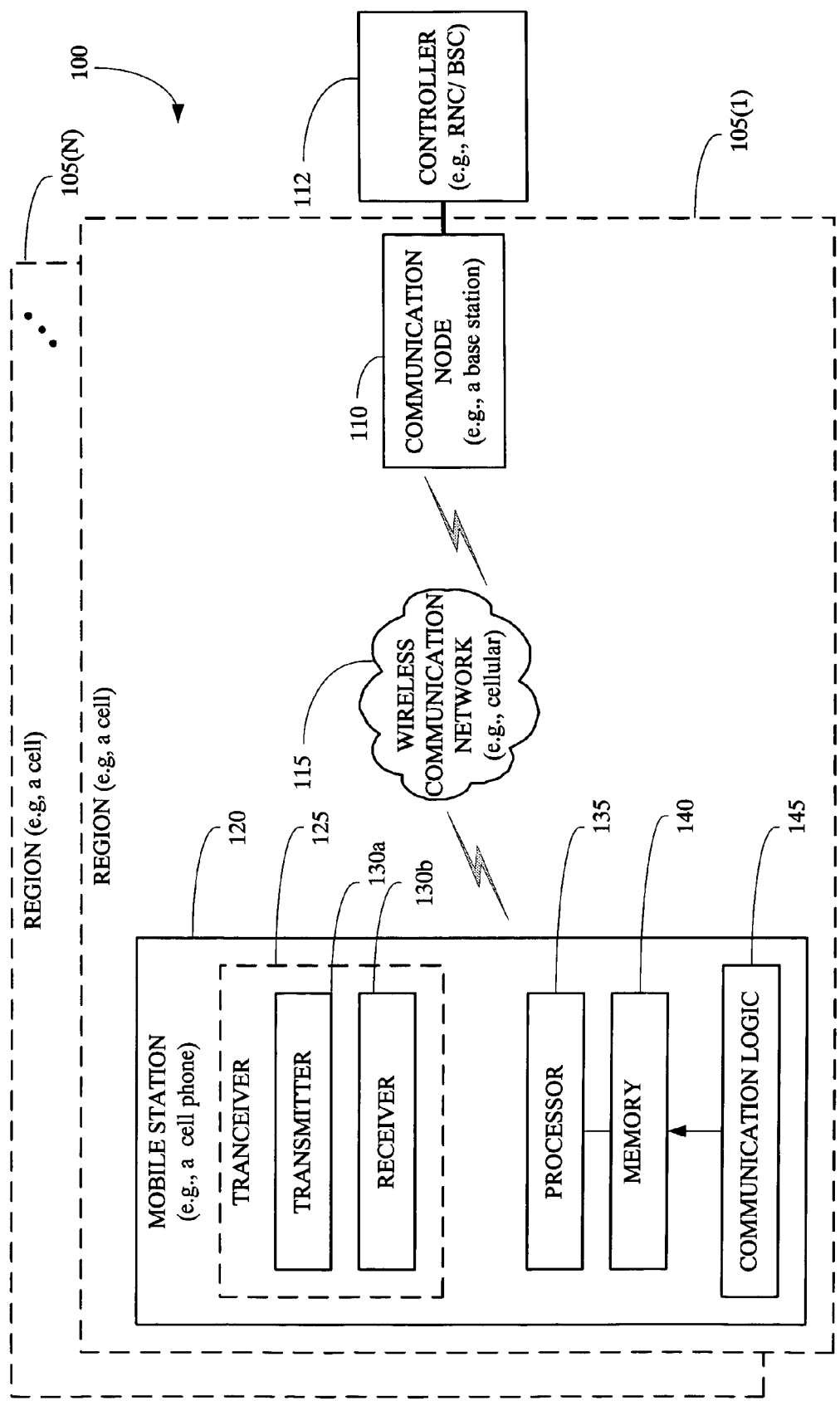
FIG. 1 illustrates a wireless communication system including a controller for a wireless communication network that performs channel assignment based on a service type and a wireless communication environment condition according to one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and apparatus is provided for adjusting threshold settings on a RF environment status and a congestion status based upon congestion on a forward and a random access channel. A service and RF environment based channel assignment may decide if a specific connection shall be established in a particular user equipment (UE) state, namely a cell forward access channel (CELL_FACH) state or a cell dedicated channel (CELL_DCH) state. Using a decision algorithm, in an implementation of the CELL_FACH state for packet data transmission, the resources on Universal Mobile Telecommunications System (UMTS) common transport channels including a forward access channel (FACH), a random access channel (RACH) and a paging channel (PCH), as well as on a dedicated channel (DCH) may be efficiently used. The already available common pilot channel (CPICH) $E_c/I_0$ measurement may be used for the purpose of a transition decision between radio resource control (RRC) states. The $E_c/I_0$ measurement may be a dimensionless ratio of the average power of a channel, typically the pilot channel, to the total signal power. A decision method may be used in RRC connection establishment, a transition from a Universal Mobile Telecommunications System Terrestrial Radio Access Network (UTRAN) paging channel (URA_PCH) state to a CELL_FACH/CELL_DCH state and a transition from a CELL_FACH state to a CELL_DCH state. In this manner, the decision method may tune the performance at UMTS coverage borders and provide a load balancing between the DCH and the common transport channels.

Referring to FIG. 1, a wireless communication system 100 includes a plurality of regions 105(1-N) and performs channel assignment across a service area based on a service type and a wireless communication environment condition according to one embodiment of the present invention. The service area of the wireless communication system 100 may be partitioned into connected service domains known as cells, where radio device users communicate via radio frequency links over a wireless medium with a communication node 110, such as a base station (e.g., Node B) serving the region 105(1). The wireless medium may be capable of handling cellular signals with cellular modems. For example, the wireless medium may operate according to Code Division Multiple Access (CDMA) standard or Global System for Mobile Communications (GSM) standard, which is a land mobile pan-European digital cellular radio communications system.

The communication node 110 may be coupled to a wireline network via a controller 112 which controls the wireless communication network 100. The controller 112, for a wireless communication network 115, determines a first indication of congestion on a forward access channel (FACH) and a second indication of congestion on a random access channel (RACH). Based on the first indication of congestion on the forward access channel, the controller 112 may adjust a first threshold and based on the second indication of congestion on the random access channel may adjust a second threshold. For example, adjustment of the first and second thresholds may be provided based upon the FACH congestion and the RACH congestion.

Moreover, at least one of status of a condition of radio frequency environment and status of a loading on a direct channel (DCH) may be determined. A value of each of the first and second thresholds may be set based on at least one of the condition of radio frequency environment and the loading on a direct channel. That is, the controller 112 may provide a threshold adjustment based on RF performance and/or loading on the DCH vs. common channels.

The controller 112 may perform channel assignment based on a service type and a wireless communication environment condition. The controller 112 may be a radio network controller (RNC) or a base station controller (BSC) capable of assigning radio frequency (RF) spectrum channels to the different regions 105(1-N), such as cells of a digital cellular network. This channel assignment may be done for voice, data, or a host of voice and data services in different-generation of wireless networks including digital cellular networks based on standards including Universal Mobile Telecommunications System (UMTS) and 3G-1X (Code Division Multiple Access (CDMA) 2000), as well as IS-95 CDMA, Global System for Mobile Communications (GSM), and Time Division Multiple Access (TDMA).

In one embodiment, each region 105 may be radiated by an antenna system associated with the communication node 110, that includes a radio transceiver to serve a mobile station 120 within the region 105(N), such as within its cell coverage area. The mobile device 120 may be a wireless device, such as a cell phone that may be used whenever a network coverage is provided. However, the mobile device 120 may be any kind of device capable of communicating with the regions 105 (1-N) in any one of suitable forms of wireless communication for portable cellular and digital phones in addition to hand-held and hands-free phones. In operation, the controller 112 may base the channel assignment of channel codes to the plurality of regions 105 (1-N) based on a service type of a request for service from a particular mobile station and a condition of wireless communication environment, such as the radio frequency (RF) environment for transmission of data over the wireless communication network 115. In one embodiment, the service type of the request for service may indicate the type of information to be transferred such as data, voice, text or radio, among communication devices. Likewise, the condition of wireless communication environment may indicate situations including channel errors near an edge of a region 105, such as a cell edge and a physical location of the mobile station 120 with reference to the center of the region 105, such as a cell center.

While the illustrative embodiment herein is categorized in terms of code assignments, it is to be understood that these same techniques may be applied by the controller 112 to frequency assignments in a FDMA system and timeslot assignments in a TDMA system. Accordingly, a number of suitable network technologies and conventional protocols may be employed to use the available bandwidth in the wireless communication network 115. The mobile station 120 may be identified on the wireless communication network 115 using a mobile address. In this manner, the controller 112 may dynamically allocate channels to the mobile station 120, requiring the available bandwidth for a service.

To communicate with the communication node 110, the mobile station 120 may comprise a transceiver 125 including a transmitter 130a and a receiver 130b. In addition, the mobile station 120 may include a processor 135 and a memory 140 storing communication logic 145. Using the transceiver 125 and the communication logic 145, the mobile station 120 may establish a wireless communication link with the communication node 110 in the wireless communication network 115 within a corresponding geographical area, i.e., the region 105(N), referred to hereinafter as a cell in one embodiment. For example, the communication node 110 may establish the wireless communication link according to a Universal Mobile Telecommunications System (UMTS) protocol. However, persons of ordinary skill in the relevant art would appreciate that the present invention is not limited to the UMTS protocol. In various alternate embodiments, the wireless communication link may be established according to any one of a desired cellular radio telephone protocol including, but not limited to, a CDMA protocol, a GSM protocol, a personal communication services (PCS) protocol, and a third generation partnership project (3GPP) protocol.

Figure 2:
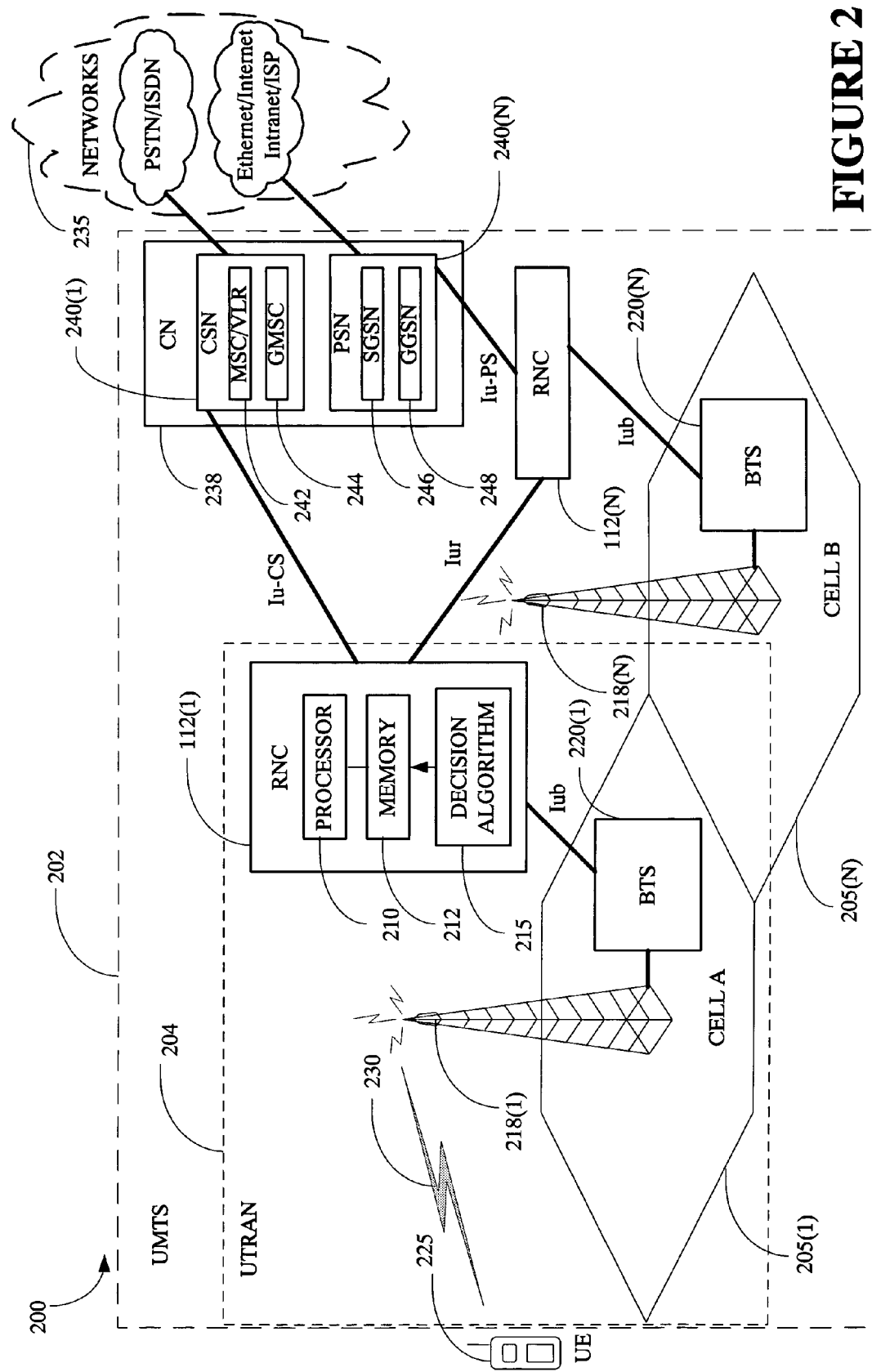
FIG. 2 illustrates a cellular telecommunication system including a radio network controller with a decision algorithm defined at least in part by Universal Mobile Telecommunications System standard in accordance with one embodiment of the present invention.

Referring to FIG. 2, a cellular telecommunication system 200 includes a first radio network controller (RNC) 112(1) serving a first cell 205(1) and a second radio network controller 112(N) serving a second cell 205(N). The first RNC 112(1) comprises a processor 210 coupled to a memory 212 storing a decision algorithm 215 defined at least in part by the Universal Mobile Telecommunications System standard, in accordance with one embodiment of the present invention. The first cell 205(1) is radiated by a first antenna system 218(1) associated with a first base transceiver station (BTS) 220(1). The first base transceiver station 220(1) may transmit/receive radio communications over the first antenna system 218(1) to serve user equipment (UE) 225, such as a cell phone within the cell 205(1) coverage area. Likewise, the cell 205(N) may include a second antenna system 218(N) associated with a second base transceiver station 220(N), which is in turn coupled to the second RNC 112(N). The user equipment 225 may be configured to communicate with the first and second antenna systems 218(1-N) and with the first and second base transceiver stations 220(1-N) according to a cellular telephone protocol such as the UMTS protocol. For example, the base transceiver station 220(1) may establish a wireless communication link 230 with the user equipment 225 using the first antenna system 218(1) within the source cell 205(1) according to the UMTS protocol.

The cellular telecommunication system 200 may comprise a Universal Mobile Telecommunications System network 202 including a Universal Mobile Telecommunications System Terrestrial Radio Access Network (UTRAN) 204 for establishing communication between the user equipment 225 and one or more networks 235, such as a Public Switched Telephone Network (PSTN) and an Integrated Services Digital Network (ISDN), Internet, Intranet, and Internet Service Providers (ISPs). The networks 235 may provide multimedia services to the user equipment 225 through the UMTS network 202. However, persons of ordinary skill in the pertinent art should appreciate that the aforementioned types of networks are exemplary in nature and are not intended to limit the scope of the present invention.

Within the UMTS network 202, the base transceiver stations 220(1-N), the first and second radio network controllers (RNCs) 112(1-N) may communicate with a core network (CN) 238 which may be in turn connected to the networks 235 via telephone lines or suitable equipment. Each radio network controller 112 may manage the traffic from the corresponding base transceiver station 220. The first RNC 112(1) is connected with the second RNC 112(N) via the $I_{UR}$ interface. The core network 238 may include a circuit switched network (CSN) 240(1) and a packet switched network (PSN) 240(N). Using the interface IU-CS, the first RNC 112(1) may communicate with the circuit switched network 240(1). Likewise, the second RNC 112(N) may communicate with the packet switched network 240(N) using the IU-PS interface. Similarly, the $I_{UB}$ interface is an interface between the first and second RNCs 112(1-N) and the first and second BTSs 220(1-N), respectively.

The circuit switched network 240(1) may comprise a Mobile Switching Center (MSC)/Visitor location Register (VLR) 242 and a Gateway Mobile Switching Center (GMSC) 244 that acts as a gateway for incoming calls into the UMTS network 202. Using the GMSC 244, the Mobile Switching Center 242 may connect the user equipment 225 to the public switched telephone network. The packet switched network 240(N) may comprise a Serving General Packet Radio Service Support Network (SGSN) 246 and a Gateway GPRS Support Network (GGSN) 248. In operation, in the UMTS network 202, user connections for the deployment of multimedia services may be carried using a GPRS Tunneling Protocol (GTP) based on the Transmission Control Protocol/Internet Protocol (TCP/IP) standard according to one embodiment.

The UMTS network 202 may ensure a provision of negotiated services between access points (APs) of a UMTS bearer service. The UMTS bearer service may be split into a radio access bearer (RAB) service, and a core network bearer service. The RAB service may in turn be split into a radio bearer (RB) service, and Iu bearer service. The RB service may be established between the user equipment 225 and the first and second RNCs 112(1-N) within the UTRAN 204. The $I_U$ bearer service may be established between the first RNC 112(1) and the MSC 242 of the circuit switched network 240(1) for voice and circuit switched data traffic. Likewise, the $I_U$ bearer service may be established between the second RNC 112(N) and the SGSN 246 of the packet switched network 240(N) in the core network 238, for packet switch data traffic.

To allow the user equipment 225 to transmit and receive cellular communications as the user equipment 225 moves across a wide geographic area, each cell 205 may be physically positioned so that its area of service or coverage is adjacent to and overlaps the areas of coverage of a number of other cells 205. When the user equipment 225 moves from an area covered by the first BTS 220(1) to an area covered by the second BTS 220(N), communications with the user equipment 225 may be transferred (handed off) from one base station to another in an area where the coverage from the adjoining cells 250(1-N) overlaps. The channels allotted to an individual cell 205(1) may be selected so that the adjoining cells 205(2-N) do not transmit or receive on the same channels. This separation is typically accomplished by assigning a group of widely separated non-interfering channels to some central cell and then assigning other groups of widely separated non-interfering channels to the cells surrounding that central cell using a pattern which does not reuse the same channels for the cells surrounding the central cell. This pattern of channel assignments continues similarly with the other cells adjoining the first group of cells.

Accordingly, in one embodiment, the UTRAN 204 may provide a set of transport channels in the physical layer, which may be configured at call setup by the cellular telecommunication system 200. A transport channel is used to transmit one data flow with a given Quality of Service (QoS) over the wireless medium. The UMTS common channels, like a forward access channel (FACH), a random access channel (RACH) and a paging channel (PCH) may be used on a given UMTS physical interface, such as the IUB interface. In this way, the user equipment 225 may communicate with the first base transceiver station 220(1) within the cell 205(1) through an assigned channel pair consisting of an uplink frequency and a downlink frequency.

Figure 3:
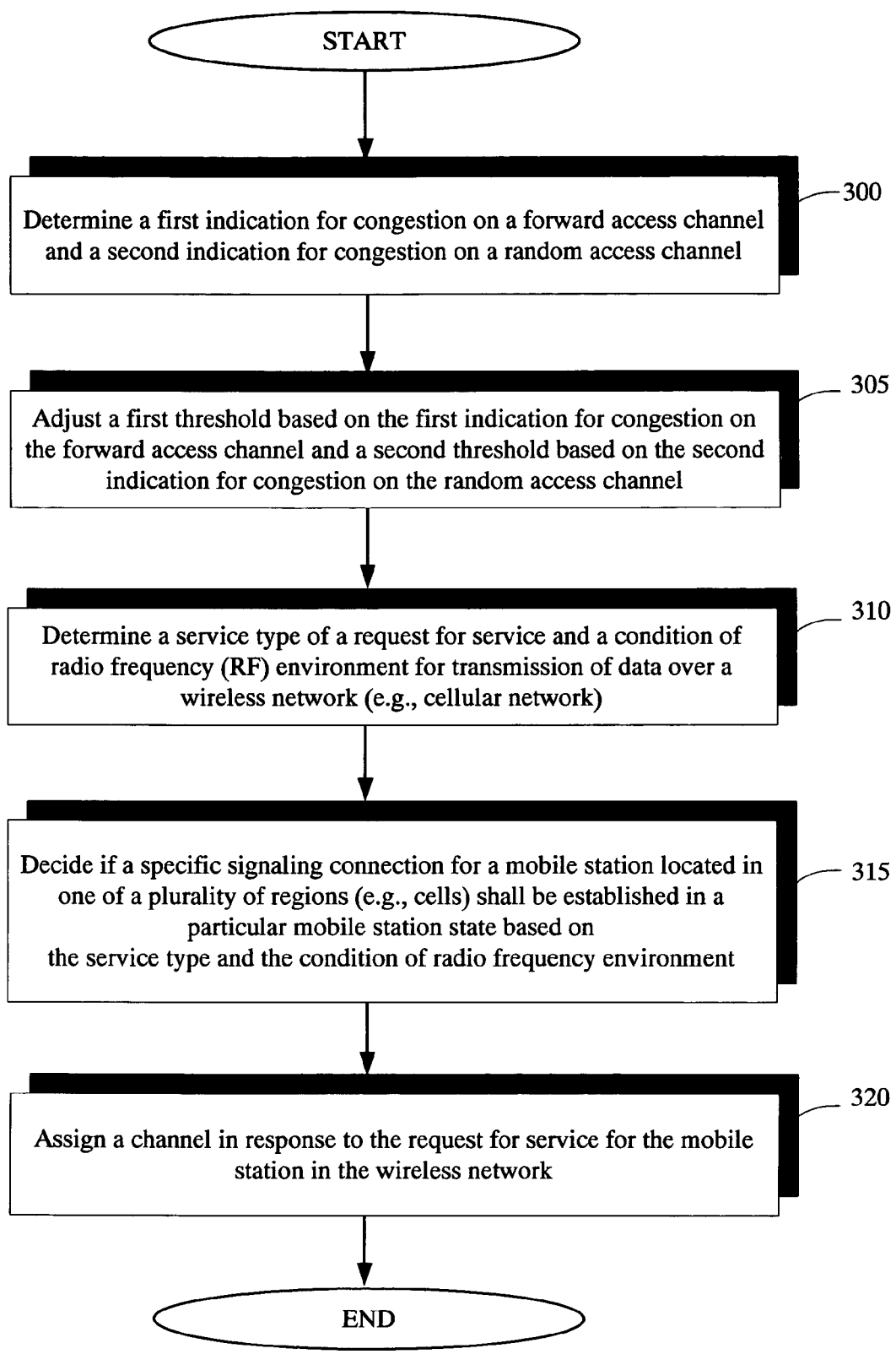
FIG. 3 illustrates a stylized representation of a method for assigning a channel in response to a request for service for a mobile station located in one of a plurality of regions of the wireless communication network shown in FIG. 1 consistent with one embodiment of the present invention.

Referring to FIG. 3, a stylized representation of method for assigning a channel in response to a request for service for a mobile station, such as the user equipment 225, located in the cell 205(1) of the cellular telecommunication system 200 shown in FIG. 2 is illustrated in accordance with one embodiment of the present invention. In one embodiment, the first radio network controller 112(1) may determine a first indication of congestion on a forward access channel and a second indication of congestion on a random access channel, as shown in block 300. The first radio network controller 112(1) may adjust a first threshold based on the first indication of congestion on the forward access channel and a second threshold based on the second indication of congestion on the random access channel, as shown in block 305. Furthermore, the first radio network controller 112(1) may determine a service type of a request for service and a condition of radio frequency (RF) environment for transmission of data over a wireless communication network in the cellular telecommunication system 200 defined at least in part by the UMTS standard, as shown in block 310.

Using the decision algorithm 215, the first RNC 112(1) may decide if a specific signaling connection for the mobile station (i.e., the user equipment 225) located in one of a plurality of regions (e.g., the cell 205 (1)) shall be established in a particular mobile station state based on the service type and the condition of radio frequency environment, as indicated at block 315. At block 320, a channel may be assigned in response to a request for service for the mobile station 120 in the wireless communication network 115 shown in FIG. 1 and for the user equipment 225 in the UTRAN 204 shown in FIG. 2.

Figure 4:
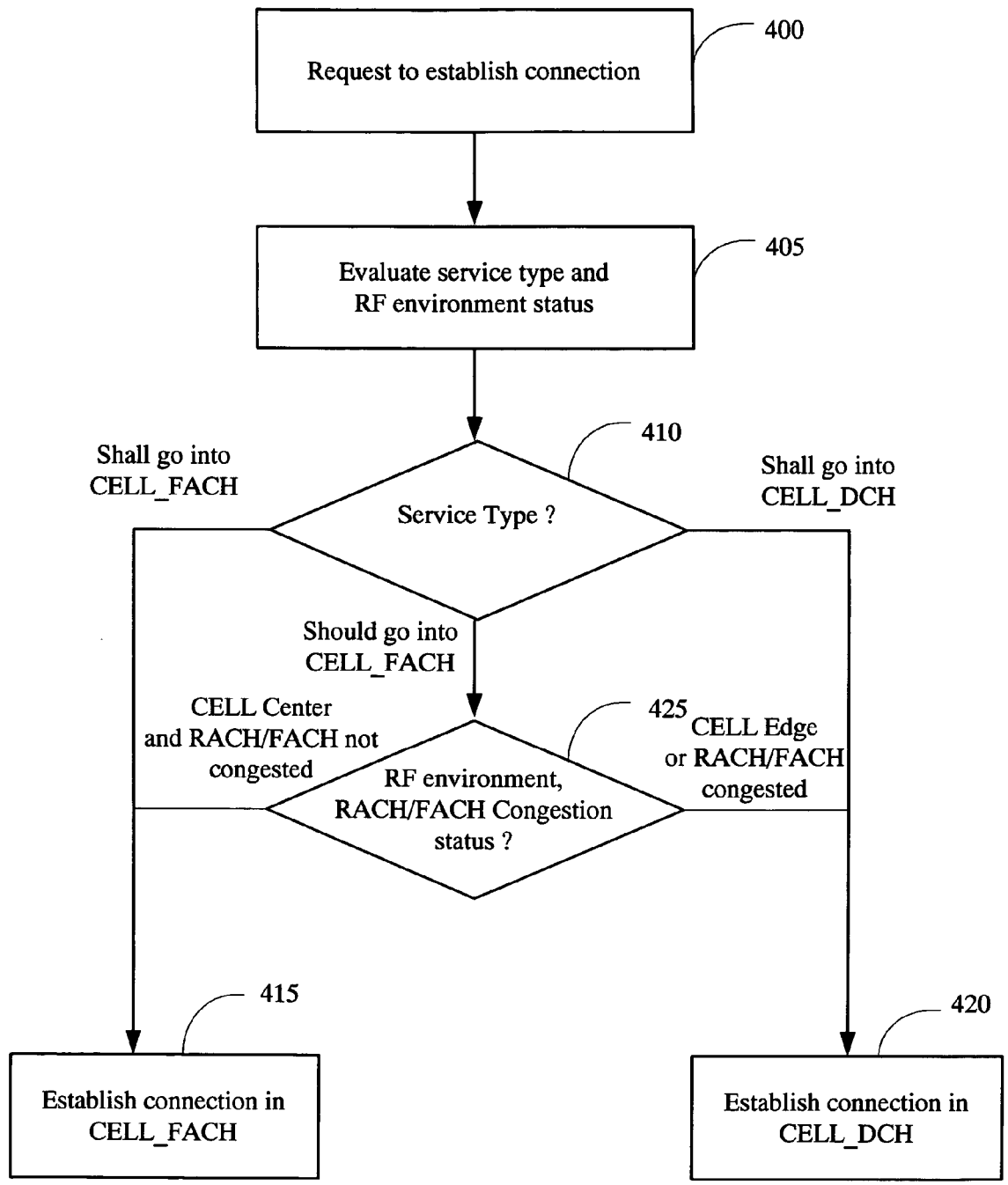
FIG. 4 illustrates a stylized representation of a method for a service and radio frequency environment based on the decision algorithm shown in FIG. 2 according to one illustrative embodiment of the present invention.

Referring to FIG. 4, a stylized representation of a method for a service and RF environment based decision algorithm shown in FIG. 2 is illustrated in accordance with one embodiment of the present invention. For example, the decision algorithm 215 may cause transition into either the CELL_DCH state or the CELL_FACH state. The decision algorithm 215 is triggered on the request to establish a signaling connection. According to one embodiment, for the decision algorithm 215 there may be three triggers including the reception of a RRC connection request (move from an IDLE state), the reception of a CELL update message with relevant cause (move from the URA_PCH state), and the reception of an initial uplink (UL) direct transfer message (move from the CELL_FACH state). Specifically, the decision algorithm 215 shown in FIG. 2 may be triggered in response to a request for service from the user equipment 225 to establish a signaling connection to the first radio network controller 112(1), as shown in block 400.

The decision algorithm 215 may classify the RRC signaling requests into different service types and different RF environment conditions. For the purpose of a service based decision, each service request may be classified into one of many categories. For the purpose of a RF environment based decision, a distinction may be made between a cell edge and a cell center. This decision may be based on the likelihood that the UE 225 is being located either in a favorable or a bad location for a transmission in the CELL_FACH.

In one embodiment, the service type may be evaluated based e.g. on the extracted "establishment cause" i.e., into one of the following three categories: (a) a service shall go into the CELL_DCH state; (b) a service shall go into the CELL_FACH state; and (c) a service should go into the CELL_FACH state. In the service shall go to the CELL_DCH state category, a service shall be assigned to a DCH in order to reserve the necessary resources from the beginning of the transmission to get guaranteed delivery of the data and strict QoS. An example of this category is an emergency call.

The service shall go to the CELL_FACH category may be used for services with no strict QoS requirements. For example, services like the background service class, short message service (SMS), registration, periodic and geographic updates may be assigned to this category. In order to not take the DCH resources these services may first get a connection in the CELL_FACH. When an increased traffic demand has been detected and the DCH resources are available, these services may go into the CELL_DCH.

The service should go into the CELL_FACH category may be used in general for all kind of RRC signaling traffic with or without QoS requirements. For optimization purposes, the CELL_FACH may be preferred. However, if it has been detected that the QoS requirements cannot be fulfilled, e.g. the UE 225 is in a bad RF environment situation or RACH or FACH are deemed to be in a congested state, the connection may also be established in the CELL_DCH in order to obtain a relatively better link quality on a closed power controlled DCH instead of an open loop power controlled FACH. This may lead to a slightly higher resource consumption and establishment overhead. The service may be detected, e.g., within the RRC connection establishment scenario from the "establishment cause" information element, which is transmitted within the RRC connection request message. The decision, which service relates to which category may be determined by, e.g., an operator via a operations administration and maintenance (OAM) parameter setting, involving a group of network management functions that provide network fault indication, performance information, and data and diagnosis functions, in one embodiment.

According to one embodiment, from the RF environment point of view there may be three typical scenarios. In the first scenario, a first UE, i.e., the UE 225 may be located nearby a first Node B, i.e., the BTS 220(1). Hence, the signal quality on the downlink FACH and the uplink RACH may be expected as sufficient to carry the data. An equivalent indicator is the measured quality on the CPICH to be $E_c/I_0 \geq$ a FACH threshold (thr_FACH). In this case, the RF environment may be defined as "a cell center." In the second scenario, a second UE may be located far away from a second Node B and receives a poor signal of the CPICH with $E_c/I_0 <$thr_FACH. In that situation, it may also be expected that the FACH is poorly received with unacceptable high error rate. Therefore, the RF environment may be defined as "a cell edge." In the third scenario, insufficient quality on the FACH even with strong $E_c/I_0$ may be received from the first Node B. For example, a third UE may be located at a position in the cell 205(1), where another signal from a second Node B may be received with nearly the same quality. In a CDMA system, this is also known as the initial soft handover zone. In that case, the interference seen from the second Node B may be substantially high and hence, the error rate on the FACH may also be high. Therefore, the RF environment of the third UE may also be defined as "a cell edge" when the initial soft handover criterion is fulfilled, i.e. when $|E_c/I_{01} - E_c/I_{02}| <$a soft handover threshold (thr_SHO). The information of the $E_c/I_0$ from the CPICH of the detected cells is given in the measured results on the RACH information element (IE) that is included, e.g., in the RRC connection request message.

The RF environment status may be determined based on the CPICH $E_c/I_0$, which is extracted from the "measured results on RACH." That is, if $E_c/I_0 \geq$a threshold for FACH, then set RF environment status=cell center; if $E_c/I_0 <$a threshold for FACH, then set RF environment status=cell edge; and if there are measurement results for more than one cell reported and if $|E_c/I_0 - E_c/I_{02}| <$a threshold for soft handover (SHO), then set RF environment status=cell edge, overwriting the decision made in the first point. According to the 3GPP standards, $E_c/I_1$ is the first reported value of the strongest cell, $E_c/I_{02}$ the second value from the second strongest. At block 405, the service type is evaluated into one of three categories based, e.g., on the extracted "establishment cause." Furthermore, the RF environment status may be determined based on the common pilot channel (CPICH) $E_c/I_0$, which is extracted from the "measured results on the random access channel (RACH)."

In some embodiments of the instant invention, the FACH congestion state may be determined by examining the amount of traffic of the same or a lower priority being transmitted over a time period. When this amount goes beyond a pre-defined threshold, the FACH is determined to be in a congested state. Likewise, the RACH congestion state may be determined by monitoring the number of RACH access denial attempts made by the Node B. When this number goes beyond a pre-defined threshold, the RACH is determined to be in a congested state.

Next the decision algorithm 215 may determine further action according to the service type. If service type indicates that a transition shall be made into the CELL_FACH state, then the connection shall be established in the CELL_FACH state. Otherwise, if service type indicates that a transition shall be made into the CELL_DCH state, then the connection shall be established in the CELL_DCH state. However, if service type indicates that a transition should be made into the CELL_FACH state, then the decision algorithm 215 decides from the RF environment status and RACH/FACH congestion state, if the connection shall be established in the CELL_FACH state or the CELL_DCH state. At decision block 410, based on the service type, a connection may be established between the user equipment 225 and the first radio network controller 112(1).

When the service type indicates that a transition should be made into the CELL_FACH state, a further action may be determined by the decision algorithm 215 based on the RF environment status. If RF environment status indicates a cell center and RACH/FACH are not congested, then the connection shall be established in the CELL_FACH state. Alternatively, if RF environment status indicates a cell edge or RACH/FACH are congested, then the connection shall be established in the CELL_DCH state. At decision block 425, based on the RF environment status and RACH/FACH congestion state, a connection may be established between the user equipment 225 and the first radio network controller 112(1).

At block 415, the connection may be established in the CELL_FACH state of the user equipment 225. That is, the connection shall be established in the CELL_FACH state because no dedicated resources are allocated since usually no call admission control (CAC) is performed. The transmission may start thereafter once the user equipment 225 shown in FIG. 2 has been informed about this decision. At block 420, the connection may be established in the CELL_DCH state of the user equipment 225. That is, the connection shall be established in the CELL_DCH state because in this case dedicated resources (code, transmit power, etc.) have to be allocated since usually a CAC functionality is performed, for example, in order to prevent overloading the air interface due to this new DCH connection. However, depending upon the service request, if CAC fails, the request may be finally denied (blocked) or may be tried to establish the call in the CELL_FACH state (i.e., with some probability of poor QoS) and retried at a later stage when resources become available.

Consistent with one embodiment, a method is provided to decide when to send the RRC signaling in a CELL_DCH state or in a CELL_FACH state. In one embodiment, a method is provided for a service, RF environment and RACH/FACH congestion based decision algorithm, which decides if a specific connection shall be established in a CELL_FACH state or in a CELL_DCH state. This decision method may be applied in the following three scenarios.

The first scenario involves a RRC connection establishment (transition from an idle mode or state to a connected mode or state). In a UMTS standard based mobile or wireless telecommunication system, such as the wireless communication system 100 shown in FIG. 1, a RRC connection may be established either in a CELL_DCH state or may be established into a CELL_FACH state. Establishing the RRC connection into CELL_FACH may be beneficial also for other service types such as conversational voice providing potential call setup delay improvements under good conditions as well as RNC capacity improvements.

The second scenario involves transition from a URA_PCH state to other cell connected states. For the purpose of supporting the always on connection for packet data services, the URA_PCH state may be supported. This dormant state is essential in order to save battery capacity in the UE 225, because during that state the UE 225 is requested to send only infrequent status reports to the UTRAN. A transition from a URA_PCH state to a CELL_DCH state or a CELL_FACH state may be supported.

The third scenario involves transition from a CELL_FACH state to a CELL_DCH state. In case the UE 225 is in a CELL_FACH state there may be the case that the allocation of a DCH is more efficient. A set of algorithms may move the UE 225 into the CELL_DCH state once the traffic demand increases and back to the CELL_FACH state once the traffic demand decreases. However, the UE 225 may wish to establish a new service within the CELL_FACH state, which falls not under scenario of increased/decreased traffic demand. In this case, the UE 225 may send a certain request to the core network 238 by using the initial direct transfer message. A suitable criterion may decide if the UE 225 shall stay in the CELL_FACH state or move to the CELL_DCH state.

Figure 5:
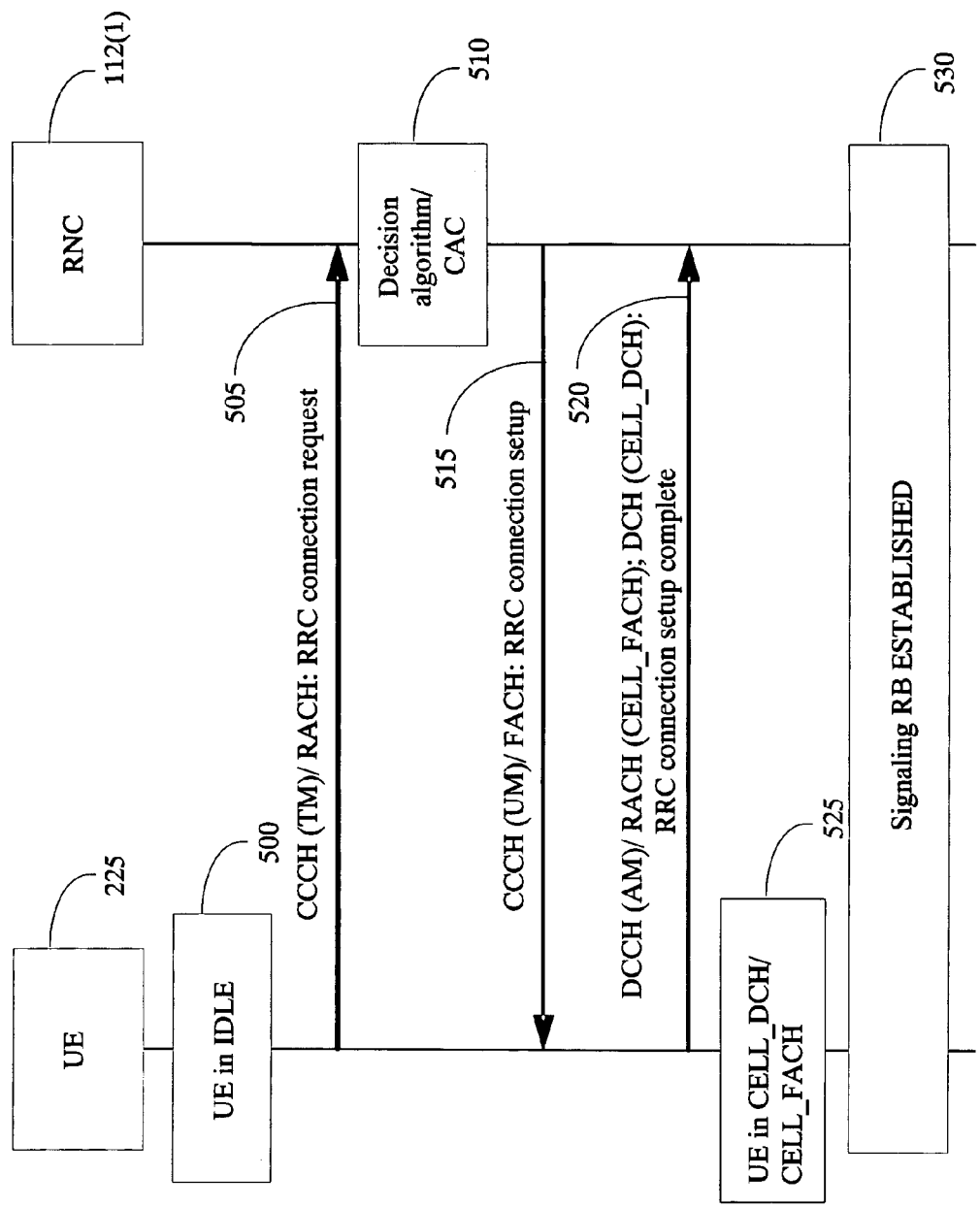
FIG. 5 illustrates a stylized representation of the decision algorithm shown in FIG. 4 during a radio resource control connection establishment procedure which transitions the user equipment shown in FIG. 2 from an idle mode to a connected mode according to one illustrative embodiment of the present invention.

Referring to FIG. 5, a stylized representation of the decision algorithm 215 shown in FIG. 4 is illustrated during a radio resource control (RCC) connection establishment procedure which moves the user equipment (UE) 225 shown in FIG. 2 from an idle mode to a connected mode according to one illustrative embodiment of the present invention. At block 500, in the beginning of the RRC connection establishment procedure, the UE 225 may be assumed to be in an idle mode. That means the UE 225 has selected the UMTS network 202 and camps on a suitable cell, e.g., the cell 205(1) shown in FIG. 2. When the UE 225 wishes to establish a RRC connection it sends a RRC connection request message to the first RNC 112(1), as indicated by an arrow 505. This RRC connection request message may be sent over a logical channel, such as the common control channel (CCCH) and a transport channel, such as the RACH in a transparent radio link control (RLC) mode. However, if the UTRAN network 204 wishes the UE 225 to establish a RRC connection it sends a paging message.

At block 510, upon the reception of the RRC connection request message, the first RNC 112(1) executes the decision algorithm 215. The service type and RF environment status may be evaluated from the establishment cause and measured results on the RACH, i.e., which are part of the received message. The RACH/FACH congestion state may be obtained from RNC internal measurements. When the decision algorithm 215 decides to go into the CELL_FACH state, the RRC connection establishment procedure may directly be started. When the decision algorithm 215 decides to go into the CELL_DCH state, the CAC functionality is performed and on the admission of the request the RRC connection establishment procedure is also continued.

As indicated by an arrow 515, assuming the RRC connection establishment procedure is continued, the first RNC 112(1) sends a RRC connection setup message to the UE 225 with an indication of the RRC state to be used by the UE 225. This message may be sent over the CCCH logical channel and the FACH transport channel in an unacknowledged RLC mode. As indicated by an arrow 520, on the reception of the RRC connection setup message, the UE 225 may configure its entities according to the parameters sent within the RRC connection setup message. When the UE 225 shall go into the CELL_FACH state, the reception on FACH and transmission on RACH may be used. When the UE 225 shall go into the CELL_DCH state, a DCH may be established. On the successful configuration and establishment of the logical channels, the UE 225 may send back a RRC connection setup complete message. This message may be sent in an acknowledged RLC mode on a logical channel, such as the dedicated control channel (DCCH), on a transport channel, such as the RACH when the UE 225 is in the CELL_FACH state or on the DCH transport channel when the UE 225 is in the CELL_DCH state.

At block 525, on the correct and RLC acknowledged reception of this message by the first RNC 112(1) both entities are synchronized by means of their RRC states and the UE 225 is now assumed to be in the CELL_FACH state or the CELL_DCH state, respectively. At block 530, 20 the signaling radio bearer (RB) may be established and the UE 225 higher layers may now communicate with the UTRAN 204 by means of the signaling RB. Then, a data RB may be established via a conventional radio access bearer (RAB) assignment procedure.

Figure 6:
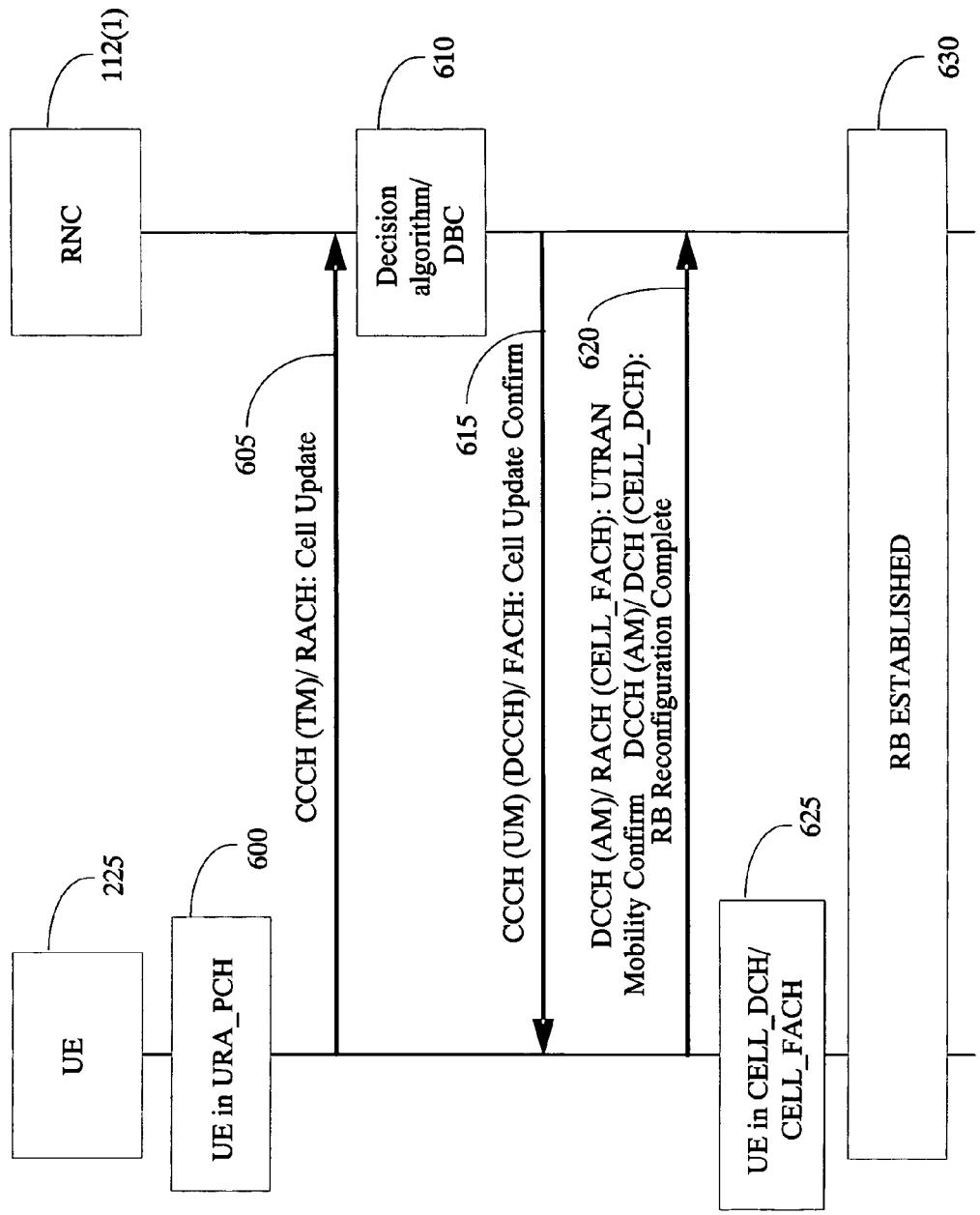
FIG. 6 illustrates a stylized representation of the decision algorithm shown in FIG. 4 during a transition of the user equipment shown in FIG. 2 from a Universal Mobile Telecommunications System Terrestrial Radio Access Network (UTRAN) paging channel (URA_PCH) state to either a cell forward access channel (CELL_FACH) state or a cell dedicated channel (CELL_DCH) state according to one illustrative embodiment of the present invention.

Referring to FIG. 6, a stylized representation of the decision algorithm 215 shown in FIG. 4 is illustrated during a transition of the user equipment (UE) 225 shown in FIG. 2 from a URA_PCH state to either a CELL_FACH state or a CELL_DCH state according to another illustrative embodiment of the present invention. At block 600, at the beginning of the transmission the UE 225 may be assumed to be in the URA_PCH state. In one embodiment, this means that the UE 225 has already some packet data bearers established, but which have been put dormant, e.g., due to currently inactive application. An arrow 605 indicates that when the UE 225 wishes to get an active connection, again, it sends a CELL update message to the first RNC 112(1). This CELL update message may be sent over the CCCH logical channel in a transparent RLC mode and over the RACH transport channel. When the UTRAN network 204 wishes that the UE 225 become active, the UTRAN network 204 may send a paging message over the paging control channel (PCCH) logical channel and the PCH transport channel.

At block 610, upon the reception of the CELL Update message, the first RNC 112 (1) evaluates, if a transition to the CELL_FACH state or the CELL_DCH state is necessary. For an uplink (UL) data transmission or a paging response, a permanent connection may not be necessary. However, if the UE 225 wishes to permanently transition into the CELL_FACH state or the CELL_DCH state, the first RNC 112(1) may trigger the decision algorithm 215. The RF environment status may be evaluated from the measured results on an information element (IE) of the RACH, which may also be included within the CELL update message. The RACH/FACH congestion state may be obtained from RNC internal measurements.

The detection of the service type may be accomplished in different ways. For example, in one embodiment, based on the 3GPP standard for the UMTS network 202, a full range of establishment causes may be inserted in the CELL update message. In that case, the service type may be obtained from these values. In the case the transition is triggered by the UTRAN network 204, the Cell update message with a cause "Paging Response" may be correlated with the associated paging message. For example, when the paging request was from the CSN 240(1), the service type may be set to should go to the CELL_FACH state and when the paging request was from the PSN 240(N), the service type may be set to shall go to the CELL_FACH state. However, if no relevant information is available, the service type may be set to shall go into the CELL_FACH state, ensuring a substantially same QoS as originally requested by the ongoing packet switched (PS) service.

When the decision algorithm 215 decides to transition into the CELL_FACH state, a transition procedure may directly be started. When the decision algorithm 215 decides to transition into the CELL_DCH state, a dynamic bearer control (DBC) functionality may be performed and on the admission of the request the transition procedure may also be continued. An arrow 615 indicates that, assuming the transition procedure is continued, the first RNC 112(1) sends a Cell update confirm message to the UE 225. This message may be sent over the CCCH (without ciphering) or the DCCH (with ciphering) logical channel and the FACH transport channel in an unacknowledged RLC mode. In case of a permanent transition, the Cell update confirm message may contain RB reconfiguration parameters in order to instruct the UE 225 to establish a connection over a specific common transport channel (CELL_FACH) or DCH (CELL_DCH), respectively.

An arrow 620 indicates that, upon the reception of the Cell update Confirm message, the UE 225 may configure its entities according to the RB reconfiguration parameters sent within the message. When the UE 225 shall go into the CELL_FACH state, the reception on FACH and transmission on RACH may be adjusted. When the UE 225 shall go into the CELL_DCH state, a DCH may be established. On the successful configuration and establishment of the logical channels, the UE 225 may acknowledge the reconfiguration by using different messages depending on the RRC state. If the UE 225 stays in the CELL_FACH state, the UE 225 may send a UTRAN mobility confirm message in an acknowledged RLC mode on the DCCH logical channel and on the RACH transport channel. When the UE 225 stays in the CELL_DCH state, the UE 225 may send a RB reconfiguration complete message in an acknowledged RLC mode on the DCCH logical channel and on the DCH transport channel.

At block 625, upon the correct and RLC acknowledged reception of the RB reconfiguration complete (DCH)/UTRAN Mobility Information Confirm (FACH) message by the first RNC 112(1), both entities may be synchronized by means of their RRC states and the UE 225 may now be assumed to be either in the CELL_FACH state or the CELL_DCH state, respectively. At block 630, after the signaling and current packet switched (PS) radio bearer (RB) are established, the UE 225 higher layers may communicate with the UTRAN 204 by means of the PS RB. Thereafter, an additional data RB may be established via a conventional RAB assignment procedure.

Figure 7:
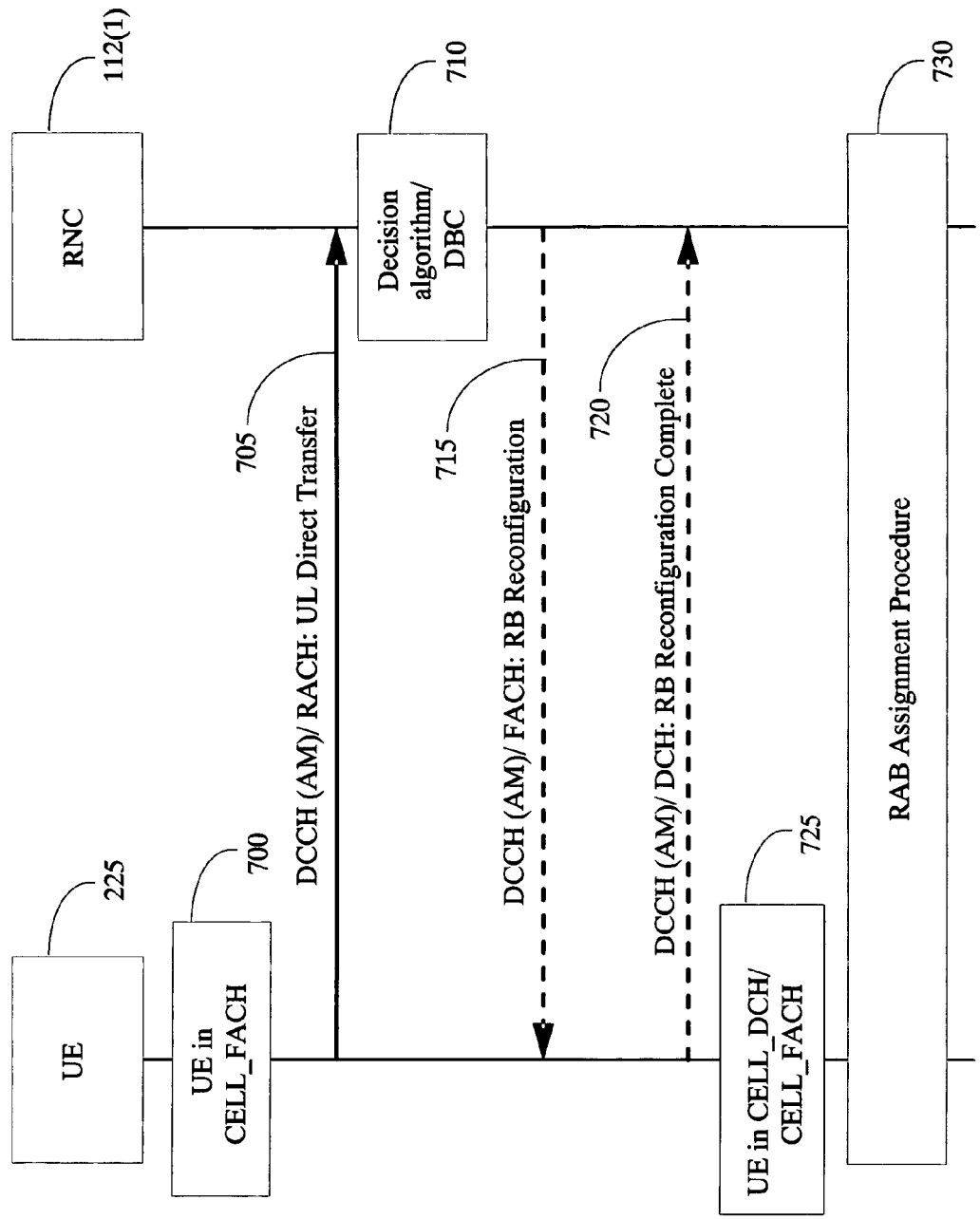
FIG. 7 illustrates a stylized representation of the decision algorithm shown in FIG. 4 during a transition of the user equipment shown in FIG. 2 from a CELL_FACH state to a CELL_DCH state in response to establishing of a radio access bearer according to one illustrative embodiment of the present invention.

Referring to FIG. 7, a stylized representation of the decision algorithm 215 shown in FIG. 4 is illustrated during a transition of the user equipment 225 shown in FIG. 2 from a CELL_FACH state to a CELL_DCH state in response to establishing of a radio access bearer (RAB) according to one illustrative embodiment of the present invention. At block 700, at the beginning of the transmission, the UE 225 may be assumed to be in the CELL_FACH state. In one embodiment, this means that the UE 225 has already some packet data bearers established and sends some packets with a low amount of traffic.

An arrow 705 indicates that when the UE 225 wishes to establish a new service, it sends an initial uplink (UL) direct transfer message to the first RNC 112(1) in order to establish a new signaling connection. This initial UL direct transfer message may be sent over the DCCH logical channel in an acknowledged RLC mode and over the RACH transport channel. When the UTRAN network 204 wishes to establish a new service towards the UE 225, it sends a paging message over the DCCH logical channel and the FACH transport channel to the UE 225. At block 710, upon the reception of the initial UL direct transfer message, the first RNC 112 (1) may evaluate whether or not the UE 225 shall stay in the CELL_FACH state or transition into the CELL_DCH state. At some point, the first RNC 112(1) may trigger the decision algorithm 215. The RF environment status may be evaluated from the measured results on an information element (IE) on the RACH, which may also be included within the initial UL direct transfer message. The RACH/FACH congestion state may be obtained from RNC internal measurements.

The detection of the service type may be done in different ways. In one embodiment, based on the 3GPP standard for the UMTS network 202, a full range of establishment causes may also be inserted in the initial UL direct transfer message. In that case, the service type may be directly obtained from these values. In another embodiment, the routing information may be extracted from the initial UL direct transfer message. For example, when the message shall be routed to the CSN 240 (1), the service type may be set to should go to the CELL_FACH state and when it shall be routed to the PSN 240(N), the service type may be set to shall go to the CELL_FACH state. However, if no relevant information is available, the service type may be set to shall go into the CELL_FACH state, ensuring a substantially same QoS as originally requested by the ongoing PS service.

When the decision algorithm 215 decides to stay in the CELL_FACH state, no further messages may be necessary. Instead, when the decision algorithm 215 decides to transition into the CELL_DCH state, a DBC functionality may be performed and on the admission of the request the transition procedure may be continued. An arrow 715 indicates that, assuming the transition procedure to the CELL_DCH state is continued, the first RNC 112(1) may send a RB reconfigure message to the UE 225. This message may be sent over the DCCH logical channel and the FACH transport channel in an acknowledged RLC mode. The RB reconfigure message may contain RB reconfiguration parameters in order to instruct the UE 225 to establish a connection over a specific DCH.

An arrow 720 indicates that, upon the reception of the RB reconfigure message, the UE 225 may configure its entities according to the RB reconfiguration parameters sent within the RB reconfigure message and a DCH may be established. Upon the successful configuration and establishment of the logical channels, the UE 225 may acknowledge the reconfiguration by sending a RB reconfiguration complete message in an acknowledged RLC mode on the DCCH logical channel and on the DCH transport channel. At block 725, upon the correct and RLC acknowledged reception of this RB reconfiguration complete message by the first RNC 112(1), both entities may be synchronized by means of their RRC states and the UE 225 may be assumed to be in the CELL_DCH state, respectively. In the other case, the UE 225 may stay in the CELL_FACH state. At block 730, an additional data radio bearer (RB) may be established via a conventional RAB assignment procedure.

Consistent with one embodiment, a parameter to tune the decision algorithm 215 is a decision threshold, thr_FACH, for the quality on the CPICH measured as $E_c/I_0$. In general, the following rule may apply. On the one hand, if thr_FACH is set to low values, a relatively more users with probably lower RF quality may be allocated to the CELL_FACH. This setting may cause increased violations of user QoS, and hence the dropping probability increases for those users. On the other hand, when thr_FACH is set to high values, relatively more users may be allocated to the CELL_DCH. This setting may increase their RF performance but due to allocating a DCH, a relatively more resources may be wasted, especially for the infrequent short signaling data, impacting the first RNC 112 (1) capacity due the performance overhead.

In one embodiment, the tuning of thr_FACH may be used to optimize the RF performance in the following two scenarios. In the first scenario, at the borders of a UMTS coverage area a different setting of thr_FACH may be used than within the UMTS network 202 coverage area. By forcing the UE 225 into the CELL_DCH state it can be ensured that the UE 225 will still receive sufficient quality on DCH even at the border coverage area, where the UMTS common channels become worse. In this case, a lower thr_FACH may be preferred. In contrast to this, the UE 225 in the CELL_DCH state at the border coverage area may consume a relatively more resources than in the central coverage area because to evaluate the necessity of an intersystem handover, a compressed transmission mode may need to be employed as early as possible. In this case, an increase in the thr_FACH may be preferred. This first scenario may be handled by an adjustment for the thr_FACH rules during RF planning.

In the second scenario, an adjustment of thr_FACH may be done based on the load on DCH and the common channels, respectively. Accordingly, a portion of the traffic may be shifted between the CELL_DCH state and the CELL_FACH state by applying different thr_FACH. This approach may be used alternatively for the decision criterion in the block 425 when neither RACH/FACH congestion is used or available. In one embodiment, autonomous adaptation algorithms may be used for tuning the thr_FACH, however, other examples may include channelisation code usage, RACH persistency and FACH data occupancy.

In some embodiments, with a decision method described above in the context of the decision algorithm 215, following advantages may be achieved. For example, a service based decision may be enhanced with the RF environment evaluated from a CPICH $E_c/I_0$ measurement, which is already available in the relevant messages. The decision method may maintain an increased efficiency by transmitting the signaling data over CELL_FACH where possible. On the other side, the decision algorithm 215 may prevent the allocation of CELL_FACH to the UE 225 in relatively bad RF conditions or when RACH or FACH are congested, which would decrease the performance and, hence, efficiency of the signaling data transmission, significantly. As a consequence a call setup delay, the first RNC 112(1) capacity rating and radio interface capacity may be improved.

The decision method may allow a unified handling for all of the three embodiments illustrated in FIGS. 5, 6, and 7, respectively, which may make the implementation easier. Furthermore, by setting the service type to shall go to the CELL_DCH state, the scenario of service-based transition of a regular packet switched (PS) data bearer to the CELL_DCH, e.g., due to buffer occupancy threshold, may also be included in the present framework. By application of the decision method, a tuning of the performance may be achieved by means of setting a threshold thr_FACH. For example, different thresholds may be used at the border of the UMTS network 202 coverage area or the threshold may be adapted in order to achieve a certain degree of load balancing between the CELL_FACH and CELL_DCH.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for assigning at least one channel of a plurality of channels to a mobile station in response to a request for service in a wireless communication network serving a plurality of regions, said mobile station being located in one of said regions, the method comprising:
   determining a first indication of congestion on a forward access channel and a second indication of congestion on a random access channel;
   determining a service type of said request for service;
   determining a radio frequency environment status based on a measured signal quality indication that is formed based on a ratio of the average power of a common pilot channel to a total signal power;
   selecting at least one dedicated channel or at least one common channel based on the first and second indications of congestion, the determined service type, and the radiofrequency environment status; and
   assigning said at least one selected channel to said mobile station.

2. A method, as set forth in claim 1, further comprising:
   adjusting a first threshold based on said first indication of congestion on the forward access channel and a second threshold based on said second indication of congestion on the random access channel;
   determining at least one of status of a condition of radio frequency environment and status of a loading on a direct channel; and
   setting a value of each of said first and second thresholds based on at least one of said condition of radio frequency environment and said loading on a direct channel.

3. A method, as set forth in claim 2, further comprising:
   determining a condition of wireless communication environment for transmission of data over said wireless communication network;
   deciding if a specific signaling connection for said mobile station located in said one of plurality of regions shall be established in a particular mobile station state based on said service type and said condition of wireless communication environment;
   detecting said request for service to establish a signaling connection;
   in response to said request for service, triggering an algorithm that decides whether to allow the transmission of data in at least one of a direct channel and a forward access channel, wherein said both channels associated with said one of plurality of regions; and
   receiving a radio resource control signaling connection request to trigger the algorithm.

4. A method, as set forth in claim 3, further comprising:
   receiving an update message for said one of plurality of regions with a cause to trigger the algorithm.

5. A method, as set forth in claim 3, further comprising:
   receiving a message for an initial uplink direct transfer to trigger the algorithm.

6. A method, as set forth in claim 3, further comprising:
   evaluating said service type of said request for service into at least one of three categories including a first category indicating that said service shall go to the direct channel associated with said one of plurality of regions, a second category indicating that said service shall go to the forward access channel associated with said one of the plurality of regions, and a third category indicating that said service should go into the forward access channel associated with said one of plurality or regions.

7. A method, as set forth in claim 6, further comprising:
   in response to said service type of said request for service being the first category indicating that said service shall go to the direct channel associated with said one of plurality of regions, establishing the signaling connection in the direct channel.

8. A method, as set forth in claim 6, further comprising:
   in response to said service type of said request for service being the second category indicating that said service shall go to the forward access channel associated with said one of plurality of regions, establishing the signaling connection in the forward access channel.

9. A method, as set forth in claim 6, further comprising:
   in response to said service type of said request for service being the third category indicating that said service should go into the forward access channel associated with said one of plurality of regions, establishing the signaling connection based on the condition of wireless communication environment and a congestion state on at least one of the forward access channel and the random access channel.

10. A method, as set forth in claim 9, further comprising:
    determining whether or not the forward access channel and the random access channel are congested based on the congestion state thereof; and
    in response to the condition of wireless communication environment to be the center of said one of plurality of regions and the forward access channel and the random access channel are determined to be not congested, establishing the signaling connection in the forward access channel.

11. A method, as set forth in claim 9, further comprising:
in response to the condition of wireless communication environment to be the edge of said one of plurality of regions or RACH/FACH are congested, establishing the signaling connection in the direct channel.

12. A method, as set forth in claim 3, further comprising:
applying the algorithm during establishment of the signaling connection using a radio resource control to cause said mobile station to transition from an idle mode to a connected mode.

13. A method, as set forth in claim 3, further comprising:
applying the algorithm during a transition of said mobile station from a paging channel associated with a registration area of a universal mobile telecommunications system terrestrial radio access network to said at least one of the direct channel and the forward access channel, said both channels associated with said one of plurality of regions.

14. A method, as set forth in claim 3, further comprising:
applying the algorithm during a transition of said mobile station from the forward access channel to the direct channel, wherein said both channels associated with said one of plurality of regions, in response to an establishment of a radio access bearer.

15. A method for assigning at least one channel of a plurality of channels to a mobile station in response to a request for service in a wireless communication network serving a plurality of regions, said mobile station being located in one of said regions, the method comprising:
detecting said request for service to establish a signaling connection;
in response to said request for service, triggering an algorithm that decides whether to allow the transmission of data in at least one of a direct channel and a forward access channel, wherein said both channels are associated with said one of plurality of regions; said algorithm comprising:
determining a first indication of congestion on a forward access channel and a second indication of congestion on a random access channel;
assigning said at least one channel of a plurality of channels to said mobile station based on said determined first and second indications of congestion
adjusting a first threshold based on said first indication of congestion on the forward access channel and a second threshold based on said second indication of congestion on the random access channel;
determining at least one of a status of a condition of a radio frequency wireless communication environment for transmission of data over said wireless communication network and a status of a loading on a direct channel;
setting a value of each of said first and second thresholds based on at least one of said condition of radio frequency environment and said loading on a direct channel;
determining a service type of said request for service;
deciding if a specific signaling connection for said mobile station located in said one of plurality of regions shall be established in a particular mobile station state based on said service type and said condition of wireless communication environment;
receiving a radio resource control signaling connection request to trigger the algorithm; and
determining for the condition of wireless communication environment a radio frequency environment status based on a measured signal quality indication being a ratio of the average power of a common pilot channel to the total signal power.

16. A method, as set forth in claim 15, further comprising:
extracting the measured signal quality indication from measured results to carry the data on the random access channel.

17. A method, as set forth in claim 16, further comprising:
comparing the measured signal quality indication with a threshold of a signal quality on the forward access channel; and
in response to the measured signal quality indication being more than or equal to the threshold, setting the condition of wireless communication environment to be the center of said one of plurality of regions.

18. A method, as set forth in claim 16, further comprising:
comparing the measured signal quality indication with a threshold of a signal quality on the forward access channel; and
in response to the measured signal quality indication being less than the threshold, setting the condition of wireless communication environment to be the edge of said one of plurality of regions.

19. A method, as set forth in claim 16, further comprising:
determining whether the measured results to carry the data on the random access channel for more than said one of plurality of regions are reported; and
in response to an absolute difference between a first reported value of a first strongest cell for a first measured signal quality indication and a second reported value of a second strongest cell for a second measured signal quality indication is less than a threshold of soft handover, setting the condition of wireless communication environment to be the edge of said one of plurality of regions.

20. A method for assigning at least one channel of a plurality of channels to a mobile station in response to a request for service in a wireless communication network sewing a plurality of regions, said mobile station being located in one of said regions, the method comprising:
detecting said request for service to establish a signaling connection;
in response to said request for service, triggering an algorithm that decides whether to allow the transmission of data in at least one of a direct channel and a forward access channel, wherein said both channels associated with said one of plurality of regions; said algorithm comprising:
determining a first indication of congestion on a forward access channel and a second indication of congestion on a random access channel;
assigning said at least one channel of a plurality of channels to said mobile station based on said determined first and second indications of congestion;
adjusting a first threshold based on said first indication of congestion on the forward access channel and a second threshold based on said second indication of congestion on the random access channel;
determining at least one of a status of a condition of a radio frequency environment for transmission of data over said wireless communication network and a status of a loading on a direct channel;
setting a value of each of said first and second thresholds based on at least one of said condition of radio frequency environment and said loading on a direct channel;
determining a service type of said request for service;

deciding if a specific signaling connection for said mobile station located in said one of plurality of regions shall be established in a particular mobile station state based on said service type and said condition of wireless communication environment;

receiving a radio resource control signaling connection request to trigger the algorithm; and adjusting a threshold of a signal quality on the forward access channel; and tuning the algorithm performance for a signal quality on a common pilot channel being measured as a ratio of the average power of the common pilot channel to the total signal power based on the adjustment of the threshold.

* * * * *